July 26, 1955     K. R. GERMANN     2,714,049
CREDIT CARD COMPUTING DEVICE
Filed Oct. 9, 1951                            4 Sheets-Sheet 2
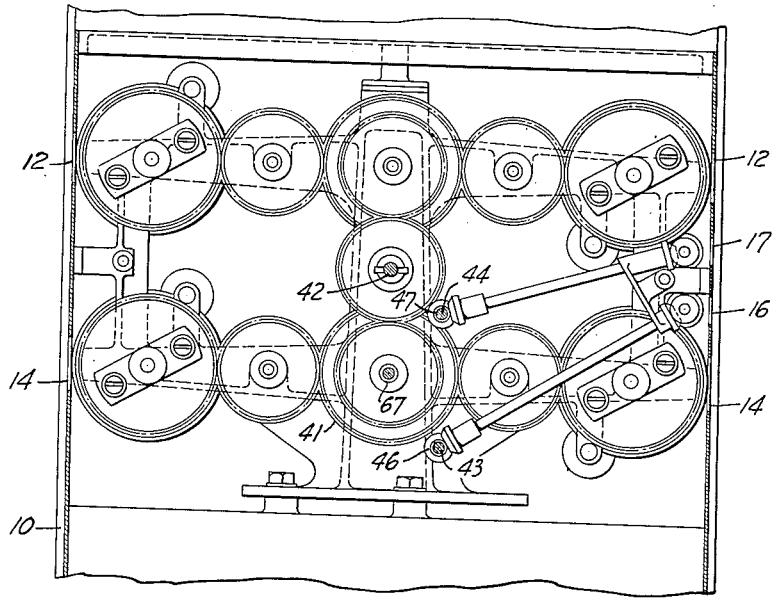
FIG_3_
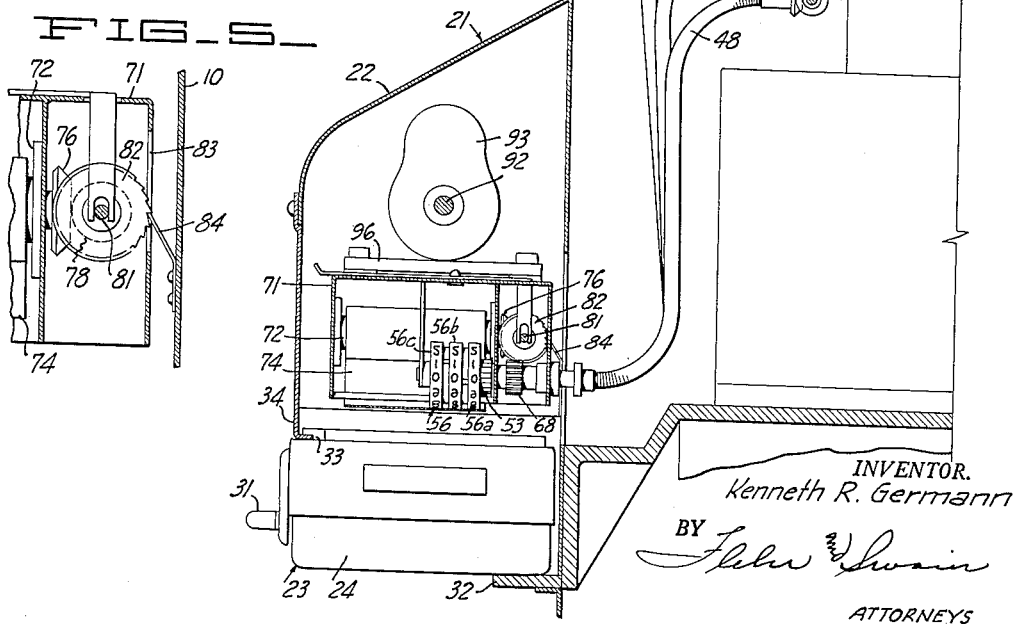
FIG_4_
FIG_5_
INVENTOR.
Kenneth R. Germann
BY
ATTORNEYS July 26, 1955　　　　　K. R. GERMANN　　　　　2,714,049
CREDIT CARD COMPUTING DEVICE
Filed Oct. 9, 1951　　　　　　　　　　　　　　　4 Sheets-Sheet 3
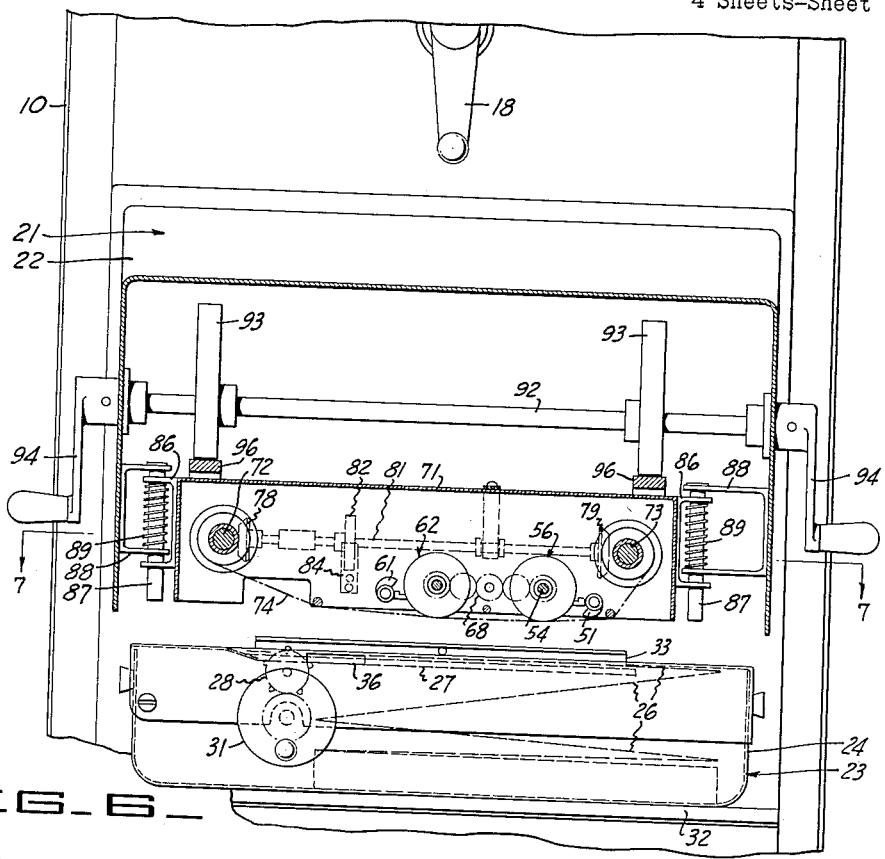
FIG_6_
FIG_7_
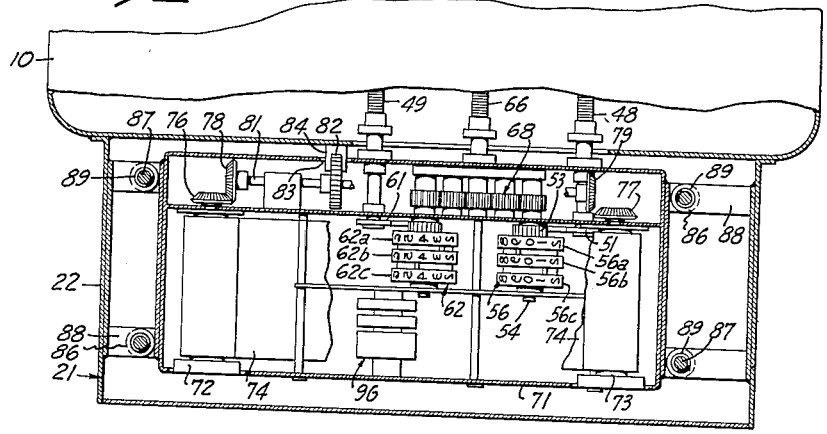
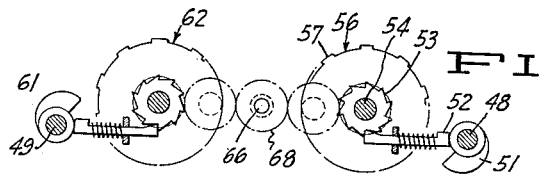
FIG_8_
INVENTOR.
Kenneth R. Germann
BY
ATTORNEYS July 26, 1955        K. R. GERMANN        2,714,049
CREDIT CARD COMPUTING DEVICE
Filed Oct. 9, 1951        4 Sheets-Sheet 4
FIG_9_
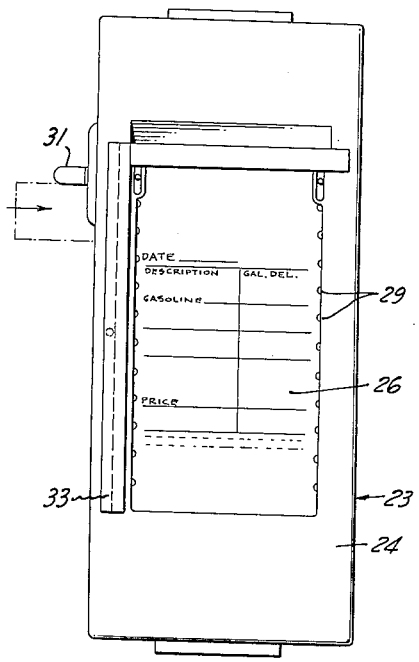
FIG_10_
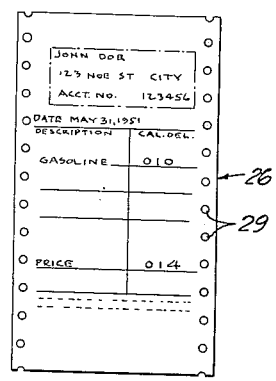
INVENTOR.
Kenneth R. Germann
BY
ATTORNEYS United States Patent Office 2,714,049
Patented July 26, 1955

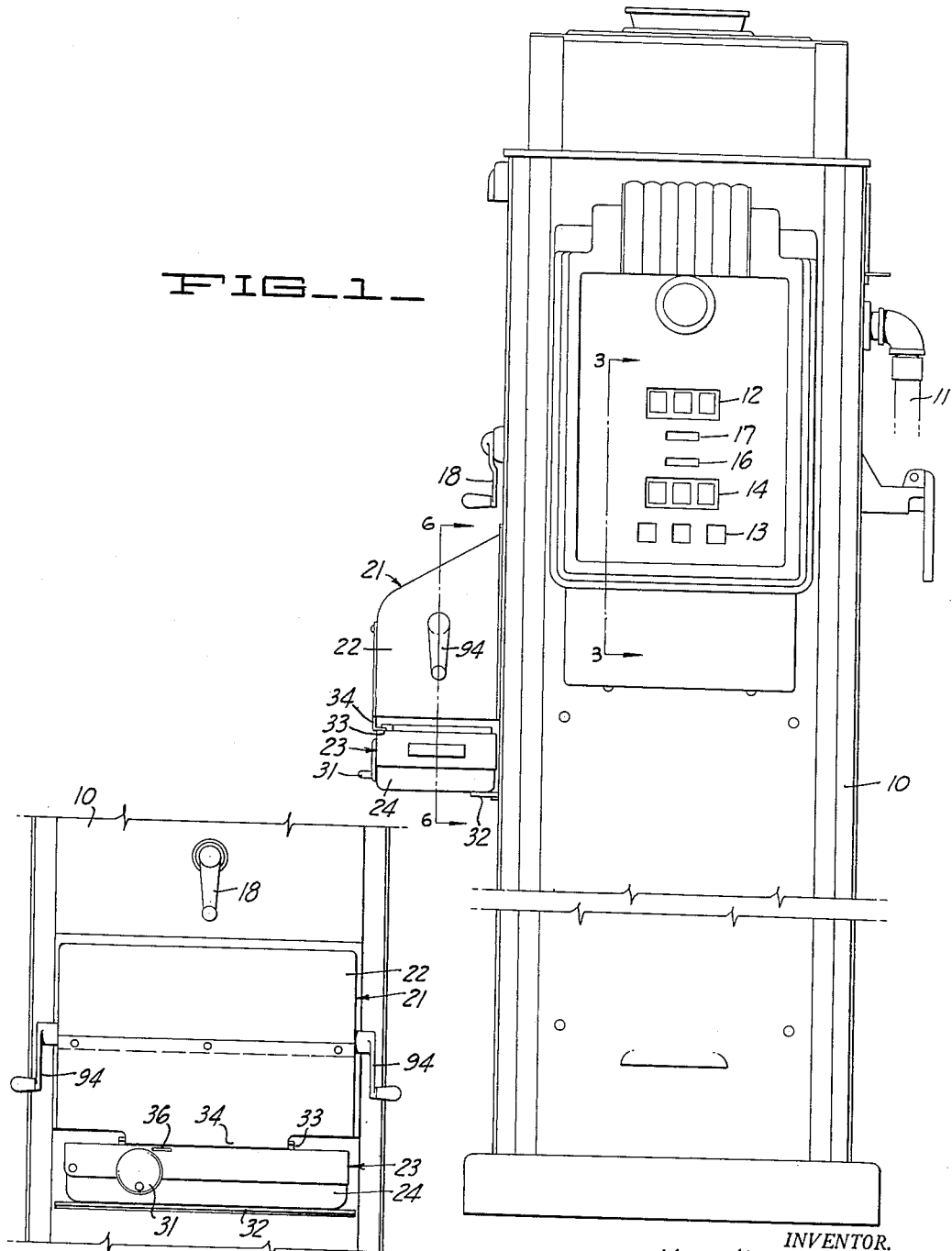

2,714,049

CREDIT CARD COMPUTING DEVICE

Kenneth R. Germann, Berkeley, Calif., assignor of one-third to Richard R. Hanna, Hillsborough, and one-third to Charles S. Barbara, San Mateo, Calif.

Application October 9, 1951, Serial No. 250,506

3 Claims. (Cl. 346—94)

This invention relates to a credit card computing device which is particularly adaptable to be used in connection with the use of credit cards of the type customarily used in connection with the retail sale and distribution of gasoline and petroleum and other products in service stations or other types of tabulation cards or systems. More particularly this device relates to a type of instrument which may be positioned adjacent to or within the present day gasoline pump for example, and be actuated thereby for the purpose of printing upon a proper sales invoice for example, certain specific information such as the number of gallons of gasoline which has been dispensed through the pump and the price of the same and the date of the sale.

There are several different methods of utilizing a so called "Credit Card System" in connection with the dispensing of such products. Probably the system which is most widely used today, is that based upon the use of an identification card which is distributed by the gasoline vendor to prospective purchasers. The purchaser when buying products of that particular distributor may present the same to the service station attendant who transcribes therefrom the identifying material to prepared invoices or statements which may be made in triplicate with the original going to the distributing company, a copy to the purchaser and the third copy remaining in the station files for future reference. This general arrangement has been subject to certain disadvantages. For example, errors in transcription of the identifying material from the purchaser's credit card to the invoice frequently result in bookkeeping errors in connection with the charging of purchases to the proper account. Furthermore, illegible or mistaken transcription of material from the computing mechanism on the conventional gasoline pump frequently results in errors as to gallonage and price.

Errors such as these are costly to the distributing company in many ways. For example, if the proper account can not be charged for the purchases, the loss must be borne by the vending company. Furthermore, if it is necessary for the accounting office of the distributing company to review great numbers of such invoices and have the same in turn reviewed by the attendants who prepared them for possible correction or interpretation, it is obvious that further waste occurs.

In addition, a system of this type has rendered it necessary for a service station attendant to devote a large portion of his time to bookkeeping, for the reason that the transcription of the material from the computing dials on the pump and from the credit card do in reality, constitute a form of bookkeeping. Various estimates have been made as to the amount of time required by the attendant and it has been shown conclusively, that could that time be eliminated or could the bookkeeping be reduced, further substantial savings would be made to the company.

It is an object of this invention therefore, to provide a simple credit card computing arrangement which will render mistakes in transcription of the identifying material from the credit card and the other information from the computing dials of the pump to the invoice more accurate and more rapid.

It is a further object of this invention to provide a device of this character which may be placed in or upon various standard types of gasoline pumps without requiring substantial replacement of these pumps by the distributing companies.

It is a further object of this invention to provide clear and accurate transfer of the identifying information upon a credit card and of the information respecting gallonage and price to the invoice.

Other objects and advantages of this invention will appear from the following specification taken in conjunction with the accompanying drawings in which:

Figure 1 represents a front elevational view of a conventional gas pump with my credit card computing device secured thereto.

Figure 2 is a side view of a portion of the pump illustrated in Figure 1 illustrating a side view of my credit card computing device which is mounted upon the side of the pump.

Figure 3 is a cross-sectional detail taken along the line 3—3 of Figure 1.

Figure 4 is a cross-sectional view of a portion of the device illustrated in Figure 1 illustrating, in cross section, a portion of my credit card computing device and the method of connecting the same to the computing and totalizing mechanism of the pump.

Figure 5 is an enlarged detail of the ribbon advancing mechanism used in my credit card computing device.

Figure 6 is a cross-sectional enlarged detail taken along the line 6 by line 6—6 of Figure 1.

Figure 7 is a cross-sectional detail taken along the line 7—7 of Figure 6.

Figure 8 illustrates the means for advancing the number wheels in my credit card computing system.

Figure 9 represents an invoice holder adapted to be used with my credit card computing device and Figure 10 represents a typical invoice which may be produced by the utilization of my device.

As illustrated in Figure 1 the conventional gasoline pump consists of a suitable housing 10 which acts as a cover for and a support for a pump, not shown, which pumps the gasoline or other petroleum products to be distributed from an underground tank through a hose 11. As the gasoline is pumped through the device it is metered and the total number of gallons being dispensed is recorded on a computer mechanism whose indices show through windows 12. The price per gallon is visible through the windows 13 and the total price is visible through the windows 14. The total gallonage and price are being continually calculated by computer mechanisms within the frame and cover 10. This assembly is substantially conventional. In addition, however, there is provided an accumulator or totalizer which records the total number of gallons dispensed through the pump, which is visible through the window 16, and the total value of the sales of gasoline through the pump which is visible through the window 17. It is customary to cover the windows 16 and 17 so that the same are not open to public inspection. However the cover may be removed or raised by the station attendant.

A reset mechanism which is operated by handle 18 is also included in the conventional dispensing pump unit. The purpose of the reset mechanism is to return the computers which are visible through the windows 12 and 14 to zero position, in preparation for the next sale. However, the information recorded upon the total count totalizers or accumulators, which information is visible in the windows 16 and 17, is not altered in any manner by the reset mechanism.

The assembly described thus far is substantially conventional. It forms a part of my invention only in so far as it forms an actuating mechanism for my device.

My credit card computing device is mounted generally on the side of the conventional pump although the same may be placed within the cover 10 in certain installations without departing from the spirit of my invention. My device consists generally of a unit which will more fully hereinafter be described but which is maintained within a cover 21 and consists of a stationary portion 22 and a removable portion 23. The removable portion 23 consists of a suitable box 24, as viewed in Figures 6 and 9, which forms a storage compartment for a plurality of invoice sheets 26 which may be of any conventional kind but which, as illustrated here, consist generally of manifold sheets comprising an original and one or more copies which are separated by appropriate carbon sheets, and which are adapted to be advanced from the storage portion of the member 24 over a rigid backing plate 27 by means of sprockets 28 which engage perforations 29 in each one or both sides of the invoice. Sprockets 28 are adapted to be rotated by a larger hand wheel arrangement 31 which, as illustrated herein, will upon one complete rotation of the same, advance the connected invoices one complete unit. As viewed in Figure 9, the invoice provides suitable space for identifying material which is to be transcribed from the credit card together with appropriate spaces for the transcription of other material such as gallonage and price of product dispensed and date of sale. Indications of the cost of service and the quantity and price of material not dispensed through the pump illustrated in Figure 1 may be written in long hand or in any other suitable manner by the service station attendant. However with the device illustrated in this application it is possible, as will more fully hereinafter be described, to place on the invoice sheet information regarding the identity of the purchaser and the value and quantity of gasoline or other product dispended through the pump.

The advantages of the invoice of the kind illustrated in Figure 10 are obvious and apparent in that it is produced quickly and accurately thus eliminating from the attendant's duties the extra duty of bookkeeping and permitting the customer to complete his transaction in less time. Furthermore, since the material has been printed upon the invoice in a mechanical and accurate manner, as will more fully hereinafter be described, bookkeeping errors and many other problems presently confronting the bookkeeping departments of major petroleum distributors are eliminated.

The box 23 is adapted to be supported upon an outwardly extending bracket 32 which engages one lower side edge thereof. The box is also provided with a longitudinal groove 33 along its opposite upper edge which is adapted to receive an inturned lip 34 which extends downwardly from the member 22. The box 23 together with the appropriate invoices may be moved longitudinally along the members 32 and 34 and slid into and out of proper position under the fixed member 22.

The member 23 is also provided with a slot 36 which permits the insertion of a credit card of the type in which the identifying material thereon is embossed or raised. When the credit card is inserted into the slot 36 it immediately underlies the invoice 26 which is otherwise supported by the plate 27. The plate 27 is provided with a groove to accommodate the embossed credit card. The method of transcribing the material on an embossed credit card which has been inserted in the slot 36 to the invoice 26 will more fully hereinafter be described.

It is apparent that the member 23 must be provided with a means for opening the same whereby a new supply of invoices 26 may be positioned therewithin. However the precise method of assembly and access does not constitute a part of this invention and any standard hinged cover or removable door will be satisfactory.

The non-movable or stationary portions of my credit card computing device are illustrated generally in Figures 4, 5, 6 and 7. That portion of the computing mechanism illustrated in Figure 3 is substantially conventional and consists generally of those gear trains which are standard in the conventional dispensing unit. The assembly is adapted to operate the gallonage computer which is visible through the windows 12 and the price computer which is visible through the windows 14. These computers are adapted to be returned to zero position by a conventional reset mechanism which is adapted to be actuated by the gear 41 through the linkage 42 operated by the handle 18.

The mechanism also actuates the total gallonage and total price totalizers which are visible through the windows 16 and 17. This mechanism is also conventional and is driven by a pair of shafts 43 and 44 which are not actuated by the reset mechanism and which can be said to operate for the purpose of accumulating or adding to total gallonage dispensed and value of gallonage dispensed.

I have prepared suitable connections 46 and 47 respectively composed of conventional bevel gear and spline arrangements whereby flexible shafts 48 and 49 respectively are adapted to transmit the rotation of the shafts 43 and 44 to my counting device.

The shaft 43 which is the gallonage totalizer, through the connection 46 and the shaft 48, drives an eccentric 51 in a counterclockwise direction as viewed in Figure 8. The cam 51 is adapted to engage a spring loaded reciprocating member 52 which is mounted for reciprocation in any suitable means and which is adapted to engage a ratchet wheel 53 which is mounted on a shaft 54. Each rotation of the cam 51 causes the ratchet wheel 53 to be advanced one notch or one-tenth of a complete revolution about the shaft 54. Also mounted upon the shaft 54 there is a plurality of numbered wheels 56 which, as indicated, are provided with raised numeral portions 57. The numeral wheels 56 are adapted to be driven by the shaft 54 and, in a manner well known to those skilled in the art, this counter is one in which the numeral wheels 56a for example, will make one complete revolution for every one-tenth of a revolution of numeral wheel 56b. Likewise numeral wheel 56b will make one complete revolution for every one-tenth of a revolution of numeral wheel 56c.

In this manner it will be apparent that the number of gallons vended will be similarly and simultaneously recorded on the totalizer viewed through the window 16 and upon the counter wheels 56, as viewed in Figure 8. In other words for each tenth of a gallon which will be recorded on the totalizer viewed on the window 16, the wheel 56a will be advanced one-tenth of a complete rotation. For every gallon recorded on the totalizer viewed through window 16 the wheel 56a will make a complete revolution and the numeral wheel 56b will make a one-tenth rotation, or, in other words, be advanced a distance equal to one of the numbers 57 appearing thereon. In this manner the total number of gallons distributed during one sale will be accurately recorded.

In much the same manner, rotation of the shaft 44 is transmitted through the coupling 47 and the flexible shaft 49 to a rotating cam 61 which is similar in construction and mode of operation to the cam 51 with the result that the numeral wheels 62 will be advanced in the same manner and simultaneously with the totalizer wheels which are viewed through the window 17. The numeral wheel 62a represents units of one cent, the numeral wheel 62b represents units of 10 cents and the numeral wheel 62c represents units of one dollar.

The reset mechanism which has been described and which returns the computers viewed through windows 12 and 14 to zero position is also connected through a flexible shaft 66 and coupling 67 to a gear train 68 which, when the reset mechanism is operated, will return the computers represented by the numeral wheels 56 and 62 to their zero position so that they are in readiness for the next sale.

The printing wheel assembly previously described is adapted to be supported within a framework 71 which consists of a box-like portion with its bottom side open. Frame 71 supports a pair of spindles 72 and 73 upon which a printing ribbon 74 is wound. Each of the spindles 72 and 73 is provided at one end with a bevel gear 76 and 77 respectively which is adapted to mesh with a similar bevel gears 78 and 79 mounted upon a rotatable shaft 81. The shaft 81 may also be reciprocated between two positions, that is, the position in which gears 76 and 78 are in mesh and gears 77 and 79 are not in mesh or to the other extreme position in which gears 77 and 79 are in mesh and the gears 76 and 78 are not in mesh. Also mounted upon the shaft 81 is a toothed gear 82 which, as indicated in Figure 5 is positioned adjacent an opening 83 in the member 71. A leaf spring member 84 which is secured to a stationary portion of my device is adapted to pass through the window 83 and engage tooth gear 82.

The entire assembly 71 and all of its component parts, including the ribbon 74 and its respective spindles, the ribbon wind and rewind mechanism consisting of the shaft 81 and its respective bevel gears 78 and 79, and the totalizer mechanism previously described, is mounted in a resilient manner so that the same may be reciprocated upwardly and downwardly. Four brackets 86 extend outwardly from the member 71 and are provided with orifices so that they may reciprocate on the vertical shafts 87 which are maintained in fixed position by end brackets 88. Springs 89 urge the entire assembly 71 to the position generally as indicated in Figure 6 which can be referred to as the elevated position. However the entire assembly 71 is, as has been previously pointed out, adapted to be reciprocated upwardly and downwardly against the pressure of the springs 89. This is accomplished by the rotation of the shaft 92 which carries the cams 93. Shaft 92 is operated by the handle 94 and the cams 93 engage pads 96 on top of the member 71.

When the handle 94 is rotated the cams 93 are likewise rotated with the result that they urge the member 71 downwardly from the position illustrated in Figure 6 until the printing tape 74 engages the upper surface of the invoice 26. Further downward movement of the member 71 causes the printing wheels 56 and 62 respectively to record the information upon the invoice inside by printing the same.

When the member 71 is urged downwardly spring 84 will engage the gear 82 and cause the same to be advanced one notch. In this manner the ribbon is caused to be wound upon one spindle and unwound from the other with the result that the ribbon is advanced from one spool to the other and does not become worn in any one spot. The shaft 81 may be reciprocated in a very simple manner to provide rewind cycle for the ribbon 74.

When a credit card is inserted in the slot 36, the raised or embossed portions thereof will lie immediately beneath the invoice manifolds. As the member 71 comes downwardly it will engage the invoices 26 and urge them downwardly into intimate contact with the embossed or raised material on the credit card in the slot 36. In this manner the entire identifying information thereon will be printed on all of the copies of the invoice.

In addition to the foregoing a date stamp arrangement 97 may be installed but the same is preferably advanced manually although the same may be advanced by a suitable clock mechnism.

Operation of the entire device may be briefly described as follows: It must be assumed that the operator has actuated the reset mechanism which, it will be recalled, is controlled by operation of handle 18 and that the computers which are visible through the windows 12 and 14 that is, the gallonage and price computers, are reset to zero and that the numeral wheels 56 and 62 are likewise reset at zero. The flow of gasoline through the pump is instituted in the conventional manner with the result, also in a conventional manner, that the quantity of gasoline being delivered and the value of the same will constantly be visible through the windows 12 and 14. It must also be borne in mind that the same information is being transmitted to the totalizers which are visible through the windows 16 and 17 and from which energy is transmitted to my device.

The member 23 is properly positioned immediately below the stationary portion 21 in the manner indicated, that is, supported by the ledge 32 and the rib 34 which is accommodated within the slot 33. The invoice 26 which is exposed possesses no information.

As the gallonage is continued to be pumped through the hose 11 the total number of gallons and the value of the same will be transmitted to the number wheels 56 and 62 respectively through the flexible shafts 48 and 49 and the ratchet advancing mechanisms 51 and 61 respectively. When the flow of gasoline through the device is terminated the number wheels 56 and 62 no longer rotate. The credit card may then be inserted within the slot 36 in such a manner that the embossed or raised portion thereof immediately underlies the group of invoices 26 which are supported on the shelf 27.

By rotating the handle 94 the entire assembly 71 is reciprocated downwardly against the tension of the springs 89 until such time as the printing ribbon 74 engages the upper surface of the upper of the invoices 26. The number wheels then impress the information which is recorded thereon upon the invoice 26. In the same manner the invoice 26 is urged downwardly over the credit card which has been inserted in the slot 36 and the identification material thereon is likewise printed on all of the invoices.

The box 24 may then be slid outwardly from beneath the assembly and handed to the customer for his inspection and approval, the latter of which may be evidenced by his signature being applied to the invoice 26 at any suitable place provided thereon.

Since the computation is being completed while the gasoline is being dispensed, it is obvious that no unnecessary time is lost during the computation procedure. The positioning of the credit card within the slot 36 may also occur at any time during the dispensing process. The actuation of the lever 94 takes substantially no time and the removal of the box 24 and the presentation of the same to the customer likewise take but a minimum of time. It is apparent therefore that the employee's time consumed by bookkeeping operations is reduced to a minimum. Likewise the time during which the purchaser is present in the station is reduced. This reduces customer complaints caused by unnecessary delays and leaves the dispensing pumps open for subsequent customers.

The objects and advantages of this invention are many as has been pointed out. Other objects and advantages of course occur to particular users and various types of accounting systems may be adapted to be used with my computing device.

Use of the embossed credit card is of course unnecessary although it may be considered by some to be desirable. The information concerning the identity of the purchaser may be written on the invoice by the attendant with the result that my device is used only to print information concerning the numbers of gallons of gasoline sold and the price of the same.

It is also apparent that the sale of other products may be listed upon the invoice by the attendant. However, since the great majority of sales in service stations are only sales of the gasoline, the majority of the invoices will not require longhand additions by the attendants. Those sales which include products other than gasoline will of course require his further efforts but such efforts will be reduced to the minimum because the identification material previously referred to will have been printed thereon.

It is further apparent that in the event other types of invoices or accounting systems are to be utilized which require for example, duplicate printing of the quantity of gasoline vended and the price thereof, simple changes may be made to my mechanism to accommodate it for this use. For example, duplication of the numeral wheel assemblies 56 and 62, and appropriate additions to the drive mechanisms 48 and 49 may be provided.

I claim:

1. In an invoice printing device, said device being adapted to be used externally in conjunction with the sale of gasoline from a conventional installed gasoline pump having totalizing means and resetting means, the combination comprising two sets of printing wheels mounted parallel to each other, a pair of connecting means for driving said printing wheels from said totalizer means, said connecting means serving to drive said printing wheels in a step-by-step manner whereby the printing wheels will be advanced to the next step only after said totalizing means have been advanced over one half of the way towards the next number, means connected to the resetting means of said pump for resetting said printing wheels to zero, removable invoice retaining means located below said printing wheels, said invoice means comprising a box adapted to contain invoices, a backing plate in the upper portion of said box, means for withdrawing an invoice from said chamber and advancing it to a position above the backing plate, a recess in said backing plate adapted to receive an embossed credit card, a printing ribbon between the printing wheels and the invoice carried above said backing plate, means for advancing said ribbon, and means for urging said printing wheels into engagement with the invoice carried above said backing plate whereby said printing wheels will leave an imprint on said invoice and said credit card will be pressed against said invoice to record the nformation contained thereon upon said invoice.

2. In an invoice printing device capable of receiving an imprint from a specially embossed credit card, said device being adapted to be used externally in conjunction with the sale of gasoline from a conventional installed gasoline pump having a totalizing means and resetting means, the combination comprising a frame, a pair of shafts mounted parallel to each other in said frame, a set of printing wheels mounted on each shaft, means for driving said printing wheels from said totalizing means, said means including a pair of shafts mounted in said frame parallel to said first named shafts, said means serving to drive said printing wheels in a step-by-step manner whereby said printing wheels will be advanced to the next step only after said totalizing means has advanced over one half of the distance towards the next number, three shafts mounted in said frame parallel to and between said first named shafts, a gear on each of the first named shafts and on each of the last named shafts, said gears serving to form a gear train, means connected to the resetting means located on said pump and one of said gears whereby when said resetting means located on said pump is operated, said printing wheels will be reset to zero, means connected to said frame for allowing vertical reciprocation of the same, removable invoice containing means located below said frame, said invoice retaining means comprising a box adapted to hold invoices, a backing plate in the upper portion of said box, means for withdrawing an invoice from said box and bringing it to a position above the backing plate, a recess in said backing plate adapted to receive an embossed credit card, a printing ribbon mounted in said frame and being carried across the bottom of said printing wheels, means for advancing said ribbon upon reciprocation of said frame, and cam operated means for urging said frame downwardly to cause said printing wheels and said ribbon to engage the invoice on said backing plate whereby said printing wheels will leave an imprint on said invoice and said embossed credit card will be pressed upon said invoice to record the information contained thereon upon said invoice, and spring means for returning said frame to its normal position out of engagement with the invoice.

3. In an invoice printing device, said device being adapted to be used externally in conjunction with the sale of gasoline from a conventional installed gasoline pump having totalizing means and resetting means, the combination comprising a plurality of printing wheels having printing indicia thereon, means for driving said printing wheels from said totalizing means of said pump in a step-by-step manner whereby said printing wheels are advanced to the next step only when said totalizing means have advanced more than one half of the way towards the next number, means for resetting said printing wheels to zero, removable invoice retaining means located adjacent said printing wheels, said invoice means comprising a box adapted to contain a plurality of invoices, a backing plate on said box, means for withdrawing an invoice from said chamber and advancing it to a position on the other side of the backing plate, a recess in said backing plate adapted to receive an embossed credit card, a printing ribbon between the print wheels and the withdrawn invoice, means for advancing said ribbon, and means for urging said printing wheels into engagement with the withdrawn invoice whereby said printing wheels will leave an imprint on said withdrawn invoice and said credit card will be pressed against said withdrawn invoice to record the information contained thereon upon said invoice.

References Cited in the file of this patent

UNITED STATES PATENTS

| 1,255,561 | Ohmer, Jr. | Feb. 5, 1918 |
| 1,875,119 | Ohmer et al. | Aug. 30, 1932 |
| 2,103,566 | Taylor | Dec. 28, 1937 |
| 2,122,319 | Joshephson | June 28, 1938 |
| 2,127,243 | Berck | Aug. 16, 1938 |
| 2,327,584 | Goldberg et al. | Aug. 24, 1943 |
| 2,328,435 | Eickmeyer et al. | Aug. 31, 1943 |
| 2,554,296 | Crews | May 22, 1951 |
| 2,612,428 | Vroom | Sept. 30, 1952 |